United States Patent [19]

Mayer

[11] 4,082,069
[45] Apr. 4, 1978

[54] METHOD AND APPARATUS TO DETERMINE THE TIMING OF CYCLICALLY REPETITIVE EVENTS, PARTICULARLY IGNITION INSTANT FOR INTERNAL COMBUSTION ENGINES

[75] Inventor: Hartmut Mayer, Aidlingen, Germany

[73] Assignee: Robert Bosch GmbH, Stuttgart, Germany

[21] Appl. No.: 660,858

[22] Filed: Feb. 24, 1976

[30] Foreign Application Priority Data

Mar. 20, 1975 Germany .............................. 2512166

[51] Int. Cl.² ................................................ F02P 5/04
[52] U.S. Cl. ............................ 123/117 D; 123/32 EB
[58] Field of Search ......... 123/32 EB, 32 ER, 117 D, 123/117 R

[56] References Cited

U.S. PATENT DOCUMENTS

| 3,696,303 | 10/1972 | Hartig ................................ 123/117 D |
| 3,831,563 | 8/1974 | Brittain et al. ..................... 123/117 D |
| 3,908,616 | 9/1975 | Sasayama ........................... 123/32 EC |
| 3,941,103 | 3/1976 | Hartig ................................ 123/117 D |
| 3,942,491 | 3/1976 | Seite et al. ......................... 123/117 D |
| 3,946,709 | 3/1976 | Monpetit ........................... 123/117 D |

FOREIGN PATENT DOCUMENTS 2,352,268 4/1975 Germany .......................... 123/117 D Primary Examiner—Ronald B. Cox
Attorney, Agent, or Firm—Flynn & Frishauf

[57] ABSTRACT

A first sequence of pulses is generated synchronously with operation of the apparatus, for example with rotation of the engine crankshaft. A reference pulse is generated upon occurrence of an operating state, for example a predetermined angular position of the crankshaft, as well as a second reference pulse occurring after the first and after a predetermined time interval has elapsed. The pulses of the sequence are counted and accumulated until the second reference pulse occurs, and are then decremented at the same pulse rate until the counter reaches a predetermined count state (for example zero), at which moment the event is triggered, for example an ignition pulse issued. The system permits adaptation to various reference pulse generators by adjustment of timing intervals, thus permitting use of reference pulses of less accuracy with respect to the apparatus with which the pulse generators are associated.

18 Claims, 2 Drawing Figures

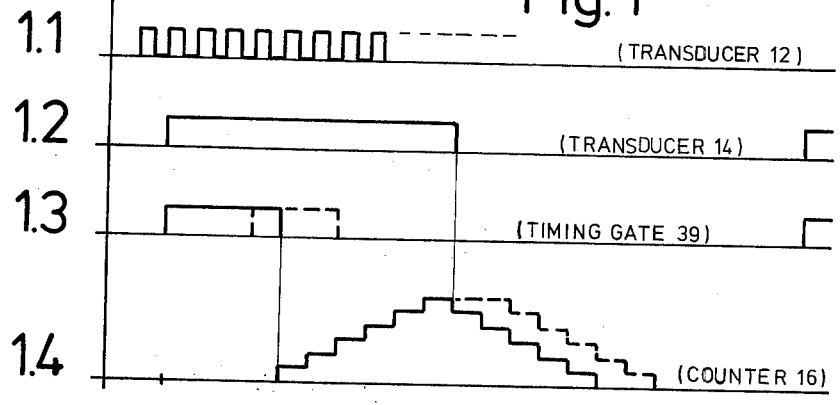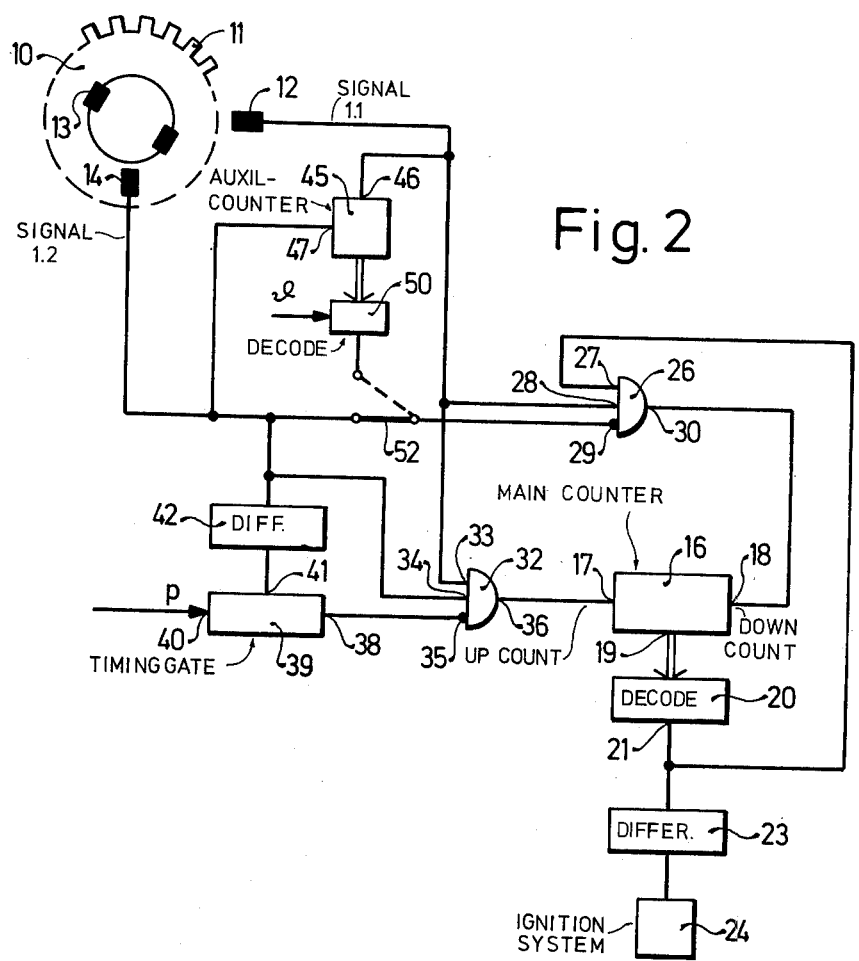

METHOD AND APPARATUS TO DETERMINE THE TIMING OF CYCLICALLY REPETITIVE EVENTS, PARTICULARLY IGNITION INSTANT FOR INTERNAL COMBUSTION ENGINES

The present invention relates to a method and to apparatus to determine the timing of an event with respect to cyclical operation of an apparatus in dependence on operating, operation or extraneous parameters affecting the timing, and more particularly to apparatus to trigger an ignition pulse in internal combustion engines.

It has previously been proposed to count cyclically repetitive sequences of pulses in a counter and to trigger an ignition pulse when the counter has reached a certain count state. The present invention is more particularly directed to such ignition systems in which the ignition timing can be set for an optimum instant of time. Optimum ignition timing is important to obtain complete combustion of the fuel-air mixture in the cylinder, and particularly to completely burn all combustible substances therein so that the emission of noxious components from the engine is a minimum, while maintaining the efficiency of operation of the engine at a maximum. In order to ensure optimum operating conditions of an internal combustion engine, the ignition timing must be set or adjusted in dependence on various operating or extraneous conditions and parameters. The most important parameters are engine speed and loading. Others, such as temperature and idle-operating conditions are of lesser importance.

It has been proposed to time the ignition instant in internal combustion engines by coupling to the engine crankshaft a rotating disk on which pulse generating markers are provided. One marker arrangement is used to determine engine speed by counting recurring pulses during a predetermined time unit; the subsequent second marker arrangement determines the ignition instant itself. The pulses of the first pulse sequence are counted, thus obtaining a count number representative of speed, and the accumulated number is then added to a second sequence of pulses until the number accumulated in the counter reaches a predetermined value. Various parameters can be changed in this system in order to inject representations of external operating conditions: one change, for example, is the period of time or the time unit during which the speed is determined; others are the distribution of the markers on the disk and the final count number or accumulated value at which the ignition instant itself is triggered.

The systems previously proposed can be so constructed that the electronic circuitry becomes comparatively simple and the component and circuit requirements can be maintained within reasonable economic limits. In order to reduce the complexity of electronic circuitry, however, the disk and the associated transducer must be made with high accuracy and, preferably, be associated with the engine crankshaft with high precision alignment. The precision required, for practical purposes, excludes mass production of the disk and assembly under mass production conditions.

It is an object of the present invention to provide a method and a system to accurately determine the timing of a recurrent event with respect to a moving apparatus, and more particularly the ignition instant in internal combustion engines, which is simple as far as circuitry is concerned and which permits the use of transducers which can be made and assembled under ordinary mass production conditions without requiring extremes of accuracy.

SUBJECT MATTER OF THE PRESENT INVENTION

Briefly, the system and apparatus of the present invention are so arranged that a timing interval is provided which can be matched to a particular installation so that a predetermined accuracy of manufacture is not required. Essentially, a reference is pulse is generated and only after the timing interval has elapsed, counting in a predetermined direction in a counter is initiated. After a predetermined distance of movement of the apparatus (in an internal combustion engine, angle of rotation of the crankshaft), the count state is counted down or decremented to a predetermined value, for example zero.

The apparatus, in accordance with the present invention, utilizes a pulse source providing sequential angle pulses representative of angles of rotation of the crankshaft of the engine, and a reference marker coupled to the crankshaft.

Logic gates are provided, connected to the up-count input of the counter and having, besides the angle pulses and the reference pulses, an additional output signal of a gate applied thereto which determines the timing of counting; the down-count input likewise has a logic gate associated therewith to which the angle pulses as well as the reference pulses are applied. The output signal from the counter is then decoded to determine when the counter has reached a predetermined count state, for example zero-count.

The gate circuit, operating as a timing gate, automatically provides advance of the ignition instant - or, in a machine in general, advance of the controlled recurring event - as speed increases, since a lesser number of pulses can be added until the reference pulse occurs, so that the count state is terminated sooner. Other parameters can be introduced into the system, for example load. Accordingly, and in accordance with a feature of the invention, the timing of the timing gate is made load-dependent. Other, further possibilities of introduction of operating, operation or ambient parameters present themselves; for example, the start of the down-count of the counter may be varied. This variation must, however, be made dependent on the angular position of the apparatus, in order to exclude further influences of engine speed. In accordance with a further feature of the invention, therefore, a further counter is provided to determine the start of the down-count, in accordance with a further operating parameter which is reset with respect to a reference marker. The output of a decoding stage having variable values is connected to the counter and is further connected to the logic gate in advance of the downcount input of the main counter.

The invention will be described by way of example with reference to the accompanying drawings, wherein:

FIG. 1, in four graphs 1.1 to 1.4, illustrates the counting arrangement of the apparatus, and method; and FIG. 2 is a block diagram of the system of the present invention.

A star disk 10 (FIG. 2) is coupled to the crankshaft of an internal combustion engine (not shown); the star disk 10 is formed with circumferential teeth 11 which are in inductively coupled relation to an angle transducer 12. The disk 10 is further formed with three reference markers 13 which extend over a fixed angle circumferentially with respect to the disk; this angle may, for example, be about 30°. The termination point of the respective marker 13 must, in any event, be in advance of the ignition instant corresponding to the most advanced ignition timing. The teeth 11, when sweeping past transducer 12, provide a signal as shown in line 1.1 of FIG. 1. The markers 13, when sweeping past transducer 14, provide a signal as shown in line 1.2 of FIG. 1.

The angle signals of line 1.1 are applied through logic gates 32, 26 to respective up-count and down-count inputs 17, 18 of a main counter 16. The main counter 16 has a parallel output 19 connected to a decoding stage 20 which, in its simplest form, may be an AND-gate which provides low output when the binary signal at its input, that is, at the output 19 of counter 16, is zero or null. Since the ignition instant is to occur at the time zero or null of the counter (as will appear), a differentiator 23 is connected to the output of decoding gate 20 responding to a zero-pulse which triggers an ignition system 24.

The logic gates 26, 32, each have three inputs 27, 28, 29 and 33, 34, 35, and have their outputs 30, 36, respectively connected to the inputs 18, 17 of the main counter 16. The input 27 of the down-count logic gate 26 is connected to the output 21 of decoding logic 20. Input 28 of down-count gate 26 is connected to the transducer 12 and thus has the angle signal of line 1.1 of FIG. 1 applied. The input 29 of gate 26 is an inverting input and is connected through a switch 52 which, however, is not strictly necessary, to the transducer 14 and thus has the signal of line 1.2, FIG. 1, applied.

The input 33 of the up-count logic gate 32 is connected to transducer 12 and thus has the signal of line 1.1, FIG. 1, applied. The input 34 is connected to the transducer 14 and thus has the reference signal of line 1.2, FIG. 1, applied. The input 35 is an inverting input and is connected to the output 38 of a timing gate or timing circuit 39. Timing circuit 39 has a timing control input 40 and a start-timing or trigger input 41. Trigger input 41 is energized over a differentiator 42 which, in turn, is connected to the output of the reference transducer 14, that is, the signal of line 1.2, FIG. 1. The timing of the timing gate 39 is controlled over control input 40, for example as a function of engine loading, as schematically indicated by the arrow P, representing control of timing as a function of pressure.

The start of the down-count can be controlled in accordance with an operating parameter, for example temperature. To effect such a control — although not strictly necessary — a further counter 45 is provided, the count input 46 of which is connected to the transducer 12 having the signal of line 1.1, FIG. 1, applied. A decoding stage 50 is connected to the output of the counter 45. The decoding number of the decoding network 50 must be controllable in dependence on the parameter selected, in this case temperature, as indicated by the δ input. The count rate is controlled at input 46; initiation of counting is controlled from terminal 47, as determined by the signal of line 1.2, FIG. 1, derived from reference transducer 14. If the additional feature of counter 45 is to be active, then switch 52 is to be placed in the broken-line position of FIG. 2.

Operation, with reference to FIG. 1: Line 1.1 illustrates the output signal of transducer 12; line 1.2 the output signal of transducer 13. Line 1.3 shows the output signal of the timing gate 39. Variation in timing is schematically indicated by the broken line in line 1.3.

The counting arrangement, or scheme, of the main counter 16 is shown in line 1.4 of FIG. 1. As can be seen, the initiation of counting occurs after a predetermined time period, as determined by the timing of gate 39. The counting sequence or cycle in one direction, in the illustrated example in the upward direction, terminates after a signal is derived from the reference transducer 14, that is, upon termination of the signal of line 1.2. Thereafter, a down-count cycle starts and when the initial state of the counter is reached again, in this case zero, a trigger signal is generated. The change or shift of initiation of the down-count is shown in broken lines in line 1.4 of FIG. 1. This causes a corresponding delay in the generation of the ignition pulse, and hence retardation of the spark.

The actual counting cycle begins with the rising flank of a pulse from the reference transducer 14. In the full-line position of switch 52, the reference pulse blocks the logic gate 26 but triggers the timing gate 39 over differentiator 42 to start a timing interval — line 1.3, FIG. 1 — as determined by the signal on control input 40. When the timing signal 39 drops out, logic gate 32 becomes conductive for the pulses from angle pulse generator 12. The main counter 16 starts its upward count. When the reference marker pulse from transducer 14 terminates, logic gate 32 blocks, and logic gate 26 becomes conductive, permitting initiation of the down-count. The main counter 16 now starts a down-count, controlled by the pulses of the pulse source 12. The decoding stage 20 does not provide a signal anymore at its output 21 when the counter has reached zero. This drop-off of the signal at output 21 of decoding stage 20 triggers a signal in differentiator 32 which, in turn, triggers an ignition pulse in a well-known ignition system. Simultaneously, the logic gate 26 is again blocked over input 26, so that the counter state of zero is maintained until the next reference marker 13 is sensed by transducer 14. If the output signal from the timing gate 39 is extended, as indicated by the broken line at the right of the full line of line 1.3, FIG. 1, the up-count starts later; the beginning of the down-count remains, however, as previously described, resulting in a lesser number of count states through which the main counter 16 has to step, so that the ignition pulse will be generated earlier, resulting in advance of the spark. Conversely, decreasing the timing of timing gate 39 as shown by the dashed lines to the left of the full line of the pulse of line 1.3, FIG. 1, will cause the counter to count through more counting steps, thus retarding the spark.

Let it now be assumed that switch 52 is thrown to the broken-line position. The position of switch 52 determines only the initiation of the down-count, but not the termination of the up-count. At the termination of any reference marker 13, auxiliary counter 45 will count the pulses from transducer 12, applied over input 46. When the decoding gate 50 decodes a predetermined count, as determined by the input at the δ input - logic gate 26 blocks and, through inverting input 29, permits gate 26 to open and to initiate the down-count, as indicated by the retarded broken-line down-count steps in line 1.4, FIG. 1. The decoding stage 50 may be any type of logic gates which are so arranged that a zero-output signal is obtained therefrom when the appropriate count number is reached while, under other conditions, a 1-signal is derived.

Differentiators 23, 42, in their simplest form, may be a resistance-capacitor combination with a suitable diode circuit to provide for appropriate polarity sensitivity. Gate 39, in a simple form, may be a monostable FF. The counters, preferably, are integrated circuit elements, such as the types CD4029, made by RCA. The timing of gate 39 can readily be adjusted or matched to any particular transducer disk 10 by simple adjustment of resistance values in the monostable FF, entirely apart from the timing control on input 40.

Various changes and modifications may be made within the scope of the inventive concept.

I claim:

1. Method to determine the timing of the ignition instant with respect to cyclical operation of a movable part of an internal combustion engine, in dependence on engine speed, comprising the steps of generating a sequence of pulses as a function of movement of, and synchronously with operation of the engine part;

generating a first reference pulse upon occurrence of a predetermined position of the engine part;

determining a timing interval having a predetermined timing duration upon generation of the first reference pulse;

generating a second reference pulse occurring after said first reference pulse, and after said timing interval;

counting the pulses of the pulse sequence after termination of the timing pulse and until occurrence of said second reference pulse, and accumulating said count in a counter (16);

decrementing the count in the counter until the count state of the counter (16) has reached a predetermined level;

and generating an output signal when the count state of said counter has reached said predetermined level.

2. Method according to claim 1, wherein the step of generating the output signal comprises generating an ignition timing trigger pulse when the count state of the counter has reached said predetermined level.

3. Method according to claim 1, further comprising the step of controlling the timing duration determining the timing interval in accordance with at least engine speed ($p$).

4. Method according to claim 1, further comprising the step of controlling the timing of occurrence of said second reference pulse with respect to a predetermined position of a cyclically movable element of the engine.

5. Method according to claim 2, further comprising the step of controlling the timing of occurrence of said second reference pulse with respect to a predetermined angular position of the engine crankshaft.

6. Method according to claim 5, further comprising the step of controlling timing duration of said timing interval in accordance with loading on the engine.

7. Method according to claim 1, wherein the step of determining the timing interval comprises generating a timing pulse having a predetermined time duration, the time duration of said pulse being controlled by engine speed.

8. Method according to claim 1, further comprising the step of controlling the initiation of decrementing the count of the counter in accordance with engine speed ($\delta$).

9. Method according to claim 6, further comprising the step of controlling the beginning of decrementing of the count of the counter in accordance with engine speed.

10. Method according to claim 1, wherein the counting rate of the decrementing count of the counter is controlled by pulses of the pulse sequence.

11. System to determine the timing of the ignition instant with respect to cyclical operation of a movable internal combustion engine part, in dependence on engine speed comprising angle pulse generating means (10, 11, 12) providing a sequence of pulses as a function of movement of, and synchronously with operation of the engine part;

reference pulse generating means (10, 13, 14) providing first and second reference pulses upon occurrence of predetermined positions of movable elements of the engine part, a main counter (16) having up-count (17) and down-count (18) inputs;

a timing circuit (39) providing a timing interval;

logic gates (32, 26) connected to the up-count and down-count inputs (17, 18) of the main counter (16), respectively, the logic gates logically applying angle pulses from the angle pulse generating means (10, 11, 12) to the up-count and down-count inputs (17, 18) of the main counter (16) upon generation of a first reference pulse, but after the timing interval of said timing circuit (39) to the up-count terminal, and after generation of the second reference pulse to the down-count terminal;

and decoding means (20) connected to the main counter (16) and providing an output signal when the main counter has decremented to a predetermined count state.

12. System according to claim 11, wherein said decoding means (20) decodes the zero or null state of the counter.

13. System according to claim 11, wherein said timing circuit provides a variable timing signal under control ($p$; 40) of a parameter affecting timing of said event.

14. System according to claim 11, further comprising an auxiliary counter (45) and a decoding gate (50) decoding predetermined count states of said auxiliary counter in accordance with a parameter affecting said timing, the auxiliary counter being connected to count pulses derived from said angle pulse generating means (10, 11, 12) upon occurrence of the second reference pulse generated by the reference pulse generating means (10, 13, 14), the decoding means (50) connected to said auxiliary counter (45) being connected to the logic gate (26) controlling down-counting of the main counter (16) to initiate down-counting of the main counter in accordance with the count state of said auxiliary counter (45) as decoded by said auxiliary decoding means (50).

15. Ignition timing system for internal combustion engines, comprising rotating means (10) and transducer means (11, 12) providing a sequence of angle pulses (1.1) synchronously with and as a function of rotation of the engine, and reference transducer means (13, 14) providing two reference marker pulses (1.2) at predetermined angular positions of the crankshaft of the engine;

a reversible main counter (16) and decoding means (20) connected to the counter and providing an output signal when the count state of the counter reaches a predetermined value;

up-count logic gate means (32) connected to the up-count input (17) of the reversible main counter (16)

and down-count logic gate means (26) connected to the down-count input (18) of the reversible main counter (16);

the timing circuit (39) being connected to and controlled by the first reference pulse of the reference pulse transducer means to initiate a timing signal and, after elapse thereof, controlling the up-count gate (32) to pass the angle pulses from the angle transducer means (11, 12) to the main counter (16) to count up after said timing interval has elapsed, and until the second reference pulse occurs, the up-count logic gate being connected to and controlled by the second reference pulse;

the down-count logic gate (26) connected to the down-count input (18) of the reversible main counter (16) controlling application of the angle transducer pulses from the angle transducer means (11, 12) to the down-count input after the second reference pulse, the decoding circuit (20) sensing when the counter has decremented to the predetermined value and providing an ignition trigger output signal.

16. System according to claim 15, wherein the timing of the timing circuit (39) is variable, said timing circuit including an input terminal (40) to which a signal representative of loading on the engine is applied.

17. System according to claim 15, further comprising second timing circuit means (45, 50), the timing interval of which is controllable in accordance with another parameter (δ) affecting ignition timing, said second timing circuit means providing a timing interval after the second reference pulse derived from the reference transducer means (13, 14) and controlling initiation of application of the angle pulses from the angle transducer means (11, 12) through the down-count logic gate (26) to the down-count input (18) of the main counter (16) to control the instant of initiation of down-count of said main counter (16).

18. System according to claim 17, wherein said second timing circuit means comprises an auxiliary counter (45) having the angle pulses from said angle transducer means (11, 12) applied thereto, and a control and decoding circuit (47; 50) controlling counting of said auxiliary counter with reference to the second reference pulse from the reference transducer means (13, 14) and said further parameter (δ) whereby, due to the timing interval as determined by said timing circuit (39) which controls initiation of the count of the main counter, the ignition instant will be determined as a function of speed and, by controlling the time duration as a function of load, the timing instant will additionally be controlled as a function of load, and said further parameter (δ) will influence initiation of the down-count and hence further affect the ignition timing.

* * * * *